United States Patent
Schmitt (10) Patent No.: US 11,523,600 B2
(45) Date of Patent: Dec. 13, 2022

(54) INSECT TRAP

(71) Applicant: Theodore Schmitt, Rutherford, NJ (US)

(72) Inventor: Theodore Schmitt, Rutherford, NJ (US)

( * ) Notice: Subject to any disclaimer, the term of this patent is extended or adjusted under 35 U.S.C. 154(b) by 127 days.

(21) Appl. No.: 16/909,562

(22) Filed: Jun. 23, 2020

(65) Prior Publication Data

US 2021/0000099 A1     Jan. 7, 2021

Related U.S. Application Data

(60) Provisional application No. 62/869,843, filed on Jul. 2, 2019.

(51) Int. Cl.
| | | |
|---|---|---|
| *A01M 1/16* | (2006.01) | |
| *A01M 1/02* | (2006.01) | |
| *A01M 1/10* | (2006.01) | |

(52) U.S. Cl.
CPC .............. *A01M 1/165* (2013.01); *A01M 1/02* (2013.01); *A01M 1/10* (2013.01); *A01M 2200/01* (2013.01)

(58) Field of Classification Search
CPC ........................... A01M 2200/01; A01M 1/14
USPC ..................................... 43/114, 115
See application file for complete search history.

(56) References Cited

U.S. PATENT DOCUMENTS

| | | | |
|---|---|---|---|
| 15,378 A | 7/1856 | Hyter | |
| 22,986 A | 2/1859 | Bigelow | |
| 139,412 A | 5/1873 | Miller | |
| 550,345 A | 11/1895 | Humphreys | |
| 662,603 A | 11/1900 | Shaw | |
| 663,728 A | 12/1900 | Church | |

(Continued)

FOREIGN PATENT DOCUMENTS

| | | |
|---|---|---|
| CA | 1125509 A | 6/1982 |
| CN | 86201606 U | 7/1988 |

(Continued)

OTHER PUBLICATIONS

Drost, et al., "Beneficial arthropod behavior mediated by airborne semiochemicals," Journal of Chemical Ecology, vol. 12, No. 6, 1986, pp. 1247-1262.

(Continued)

*Primary Examiner* — Joshua J Michener
*Assistant Examiner* — Nicole Paige Maccrate
(74) *Attorney, Agent, or Firm* — FisherBroyles, LLP (57) ABSTRACT

An insect trap including a base having an upper end defining a cavity for receiving a removable bait cup. A main housing defining a plurality of openings is matable to the base in an upright position. The main housing defines a mounting structure for supporting a hanger for supporting an uncoiled roll of flypaper within the main housing. A spacer centers an uncoiled roll of flypaper within the main housing. An upper cap free from openings allowing passage of any incident water through the upper cap is matable with the upper end of the main housing. The insect trap is capable of free-standing outdoor use, outside of any enclosure or overhanging structure, while resisting penetration of rain/precipitation into the main housing. The base, main housing, hanger and upper cap are matable to define a weather-resistant enclosure for suspending flypaper within the main housing above the internal cavity of the base.

21 Claims, 5 Drawing Sheets

(56) References Cited

U.S. PATENT DOCUMENTS

| | | | |
|---|---|---|---|
| 805,352 A | 11/1905 | Edgar | |
| 962,561 A | 6/1910 | Farrington | |
| 970,784 A | 9/1910 | Boehm | |
| 1,012,566 A | 12/1911 | Maire | |
| 1,031,889 A | 7/1912 | Thieme | |
| 1,072,342 A | 9/1913 | Louviere | |
| 1,247,724 A | 11/1917 | Sassenhoff | |
| 1,252,151 A | 1/1918 | Nakamigawa | |
| 1,277,298 A | 8/1918 | Dreilick | |
| 1,326,818 A | 12/1919 | Yoshikawa | |
| 1,379,948 A | 5/1921 | Wallace | |
| 1,477,081 A | 12/1923 | Salinas | |
| 1,505,886 A | 8/1924 | Haley | |
| 1,540,649 A | 6/1925 | Power | |
| 1,577,148 A | 3/1926 | Pical | |
| 1,598,269 A | 8/1926 | Derr | |
| 1,634,648 A | 7/1927 | Cardinet | |
| 1,783,631 A | 12/1930 | Sladky | |
| 1,822,307 A | 9/1931 | Nettekoven | |
| 1,964,611 A | 6/1934 | Watson | |
| 1,968,953 A | 8/1934 | Metzger | |
| 1,971,640 A | 8/1934 | Cameron | |
| 2,020,283 A | 11/1935 | Armstrong | |
| 2,073,791 A * | 3/1937 | Graef | A01M 1/165 43/116 |
| 2,176,345 A | 10/1939 | Hurwitt | |
| 2,490,498 A | 12/1949 | Wisen | |
| 2,715,295 A | 8/1955 | Brown | |
| 2,873,551 A | 2/1959 | Misko | |
| 2,979,856 A | 4/1961 | Ponting | |
| 3,023,539 A | 3/1962 | Emerson, Jr. | |
| 3,304,646 A | 2/1967 | Staley | |
| 3,465,468 A | 9/1969 | Takamoto | |
| 3,708,908 A * | 1/1973 | Levey | A01M 1/14 43/114 |
| 3,931,692 A | 1/1976 | Hermanson | |
| 3,939,802 A | 2/1976 | Neff | |
| 3,992,803 A | 11/1976 | Kaiser | |
| 3,997,999 A | 12/1976 | Evans | |
| 4,002,146 A | 1/1977 | Neff | |
| 4,141,173 A | 2/1979 | Weimert | |
| 4,145,836 A | 3/1979 | Zeller | |
| 4,244,135 A | 1/1981 | Harwoods | |
| 4,266,363 A | 5/1981 | Chen | |
| 4,360,987 A | 11/1982 | Lowder | |
| 4,411,093 A | 10/1983 | Stout | |
| 4,411,094 A | 10/1983 | Spackova | |
| 4,476,647 A | 10/1984 | Hall, Jr. | |
| 4,490,938 A | 1/1985 | Baker | |
| 4,577,434 A * | 3/1986 | Davis | A01M 1/145 43/114 |
| 4,608,774 A | 9/1986 | Sherman | |
| 4,642,936 A | 2/1987 | Jobin | |
| 4,667,430 A | 5/1987 | Ziese, Jr. | |
| 4,686,789 A | 8/1987 | Williams | |
| 4,694,604 A | 9/1987 | Mitchell | |
| 4,706,410 A | 11/1987 | Briese | |
| 4,718,193 A | 1/1988 | Rosselli | |
| 4,802,303 A | 2/1989 | Floyd, III | |
| 4,829,702 A | 5/1989 | Silvandersson | |
| 4,908,980 A | 3/1990 | Sherman | |
| 4,947,578 A | 8/1990 | Anderson | |
| 4,953,320 A | 9/1990 | Nelson | |
| 4,959,924 A | 10/1990 | Martin | |
| 4,986,024 A | 1/1991 | Peek | |
| 5,031,354 A | 7/1991 | Olson | |
| 5,048,224 A | 9/1991 | Frisch | |
| 5,090,153 A | 2/1992 | Mullen | |
| 5,205,064 A | 4/1993 | Nolen | |
| 5,231,792 A | 8/1993 | Warner | |
| 5,327,667 A | 7/1994 | Fore | |
| 5,369,908 A | 12/1994 | Morales | |
| 5,383,301 A | 1/1995 | Babb | |
| 5,596,833 A | 1/1997 | Harrie | |
| 5,682,706 A | 11/1997 | Altenburg | |
| 5,884,801 A | 3/1999 | Simpson | |
| 5,950,355 A | 9/1999 | Gilbert | |
| 5,983,557 A | 11/1999 | Perich | |
| 6,014,834 A | 1/2000 | Ferland | |
| 6,018,905 A | 2/2000 | Lingren | |
| 6,083,498 A | 7/2000 | Landolt | |
| 6,164,010 A | 12/2000 | Snell | |
| 6,393,759 B1 | 5/2002 | Brown | |
| 6,393,760 B1 | 5/2002 | Lingren | |
| 6,493,986 B1 | 12/2002 | Nelson | |
| 6,571,732 B2 | 6/2003 | Hight | |
| 6,594,946 B2 | 7/2003 | Nolen | |
| 6,625,922 B1 | 9/2003 | Ernsberger, IV | |
| 6,718,687 B2 | 4/2004 | Robison | |
| 6,754,988 B1 | 6/2004 | Downey | |
| 6,857,579 B2 | 2/2005 | Harris | |
| 6,886,292 B2 | 5/2005 | Studer | |
| 6,898,896 B1 | 5/2005 | McBride | |
| 6,901,694 B1 | 6/2005 | Neault | |
| 6,959,510 B1 | 11/2005 | Nelson | |
| 6,966,142 B1 * | 11/2005 | Hogsette | A01M 1/2005 43/107 |
| 7,073,287 B2 | 7/2006 | Lau | |
| 7,096,621 B2 | 8/2006 | Nelson | |
| 7,165,353 B2 | 1/2007 | Matts | |
| 7,284,350 B2 | 10/2007 | Nelson | |
| 7,469,499 B2 | 12/2008 | Nelson | |
| 7,788,845 B2 | 9/2010 | Nelson | |
| 7,841,131 B2 | 11/2010 | Nelson | |
| 8,104,223 B1 | 1/2012 | Rodriguez | |
| 9,179,662 B1 | 11/2015 | Kort | |
| D768,258 S | 10/2016 | Godin | |
| D776,228 S * | 1/2017 | Caruso | D22/122 |
| 2002/0078620 A1 | 6/2002 | Nelson | |
| 2003/0089024 A1 | 5/2003 | Nelson | |
| 2003/0151006 A1 | 8/2003 | Dykstra | |
| 2004/0001870 A1 | 1/2004 | Durand | |
| 2004/0231228 A1 | 11/2004 | Pazik | |
| 2004/0237379 A1 | 12/2004 | Long | |
| 2005/0055870 A1 | 3/2005 | Yelverton | |
| 2006/0048442 A1 | 3/2006 | Leming | |
| 2006/0053683 A1 | 3/2006 | Lau | |
| 2007/0182547 A1 | 8/2007 | Wachter | |
| 2009/0071060 A1 | 3/2009 | McKay | |
| 2009/0288333 A1 | 11/2009 | Johnston | |
| 2010/0154290 A1 * | 6/2010 | Fisher | A01M 1/02 43/114 |
| 2011/0016771 A1 | 1/2011 | Crouse | |
| 2012/0110893 A1 | 5/2012 | Fabry | |
| 2012/0297662 A1 | 11/2012 | Strube | |
| 2013/0283670 A1 | 10/2013 | Parys | |
| 2013/0318854 A1 | 12/2013 | Zhang | |

FOREIGN PATENT DOCUMENTS

| | | |
|---|---|---|
| CN | 2708660 Y | 7/2005 |
| CN | 201075953 Y | 6/2008 |
| CN | 201119366 Y | 9/2008 |
| CN | 201194514 Y | 2/2009 |
| CN | 201332638 Y | 10/2009 |
| CN | 201388460 Y | 1/2010 |
| CN | 201451107 U | 5/2010 |
| CN | 201568831 U | 9/2010 |
| CN | 201690930 U | 1/2011 |
| CN | 201839723 U | 5/2011 |
| CN | 201869687 U | 6/2011 |
| CN | 201947824 U | 8/2011 |
| CN | 201957631 U | 9/2011 |
| CN | 201967550 U | 9/2011 |
| CN | 202135607 U | 2/2012 |
| CN | 202172713 U | 3/2012 |
| CN | 202179059 U | 4/2012 |
| CN | 202222297 U | 5/2012 |
| CN | 202285960 U | 7/2012 |
| CN | 202551959 U | 11/2012 |
| CN | 203040489 U | 7/2013 |
| CN | 203181838 | 9/2013 |
| CN | 2032901 | 11/2013 |
| CN | 203934552 U | 11/2014 |

(56) References Cited

FOREIGN PATENT DOCUMENTS

| CN | 204090836 U | | | 1/2015 | |
|---|---|---|---|---|---|
| DE | 155660 | | | 11/1904 | |
| DE | 19637084 C1 | | | 2/1998 | |
| DE | 10055135 A1 | | | 5/2002 | |
| DE | 202013004544 | | | 6/2013 | |
| EP | 1767089 A1 | | | 3/2007 | |
| GB | 246083 A | * | 1/1926 | ............ | A01M 1/165 |
| GB | 340698 A | * | 1/1931 | ............ | A01M 1/165 |
| GB | 2258599 | | | 2/1993 | |
| WO | 2001078502 A1 | | | 10/2001 | |
| WO | 2015013110 A1 | | | 1/2015 | |

OTHER PUBLICATIONS

Schemnitz, et al., "Capturing and Handling Wild Animals," 2009, pp. 64-117.
Schroeder et al., "Walk-in Traps for Capturing Greater Prairie-Chickens on Leks," J. Field Ornithol, 62(3), pp. 378-385.
Tumlinson et al., "How Parasitic Wasps Find Their Hosts," Scientific America, Mar. 1993, pp. 100-106.

\* cited by examiner

INSECT TRAP

CROSS-REFERENCE TO RELATED APPLICATION

This application claims the benefit of priority, under 35 U.S.C. § 119(e), of U.S. Provisional Patent Application No. 62/869,843, filed Jul. 2, 2019, the entire disclosure of which is hereby incorporated herein by reference.

FIELD OF THE INVENTION

The present invention relates generally to insect traps, and more particularly to an improved flypaper-based trap for catching flies and similar insects. More particularly, the present invention provides a flypaper-based trap including a free-standing enclosure configured for easy manual disassembly and including an upper cap configured to cover an extended roll of conventional flypaper which is suspended within the enclosure above a weighted removable base that is configured to receive and house interchangeable disposable bait cups for holding food waste scraps, to provide an inexpensive yet highly effective trap, without the need for commercially produced pheromone—or other chemical-based attractants.

BACKGROUND

Flies and other insects are pesky and gross. They infest in places where food is prepared, served, and processed such as in restaurant kitchens and food processing establishments. They spoil outdoor activities such as backyard barbecues and gatherings. Their larvae, commonly known as maggots, continue to hatch on rotting plant and animal material even as the adult population is eliminated, which makes necessary an efficient and prolonged elimination of the adult population.

Various insect traps are known. Some of these insect traps make use of an extendable roll of viscous tackifier material, commonly known as flypaper. Some of these traps include a casing or other support for the flypaper.

However, such known traps are commonly made to be suspended/hung from a hook or other support and/or include commercially produced pheromone-based or chemical-based attractants for luring flies into the insect trap, which can be undesirable. The approved chemical name for pheromones is Z-9 Tricosene.

Additionally, conventional insect trap devices often require regular maintenance of mechanical parts or replacement of substances such as the attractants, wetting agents and/or insecticides. Further, many conventional traps are designed to be disposable after a single use session, such that when attractants or other components are used up, the entire device must be discarded and replaced at the cost of an entire new insect trap device. Still other various devices utilize a variety of different components such as protruding cones, transparent barrels, permanent bait plates, insecticides, wetting agents, electrolytes, light absorbing shields, alkaline substances, prismatic metal flakes, adhesive-coated hinged trays, chemical essences, non-drying adhesive coatings, among many others, all of which complicate (to varying degrees) and/or make more expensive (to varying degrees) the function of catching and killing flies.

What is needed is a simple, inexpensive and effective trap that effectively attracts, traps, and kills flies that avoids the use and need for commercially-produced chemical-based attractants that deplete over time and require purchase of purpose-specific replenishable materials, and that allows for re-use of the most expensive components of the device, and that does not require hooks or other mounting structures for suspending the device, which limits where the device can be placed.

BRIEF DESCRIPTION OF THE DRAWINGS

The present invention provides an insect trap that meets these needs, among others. An exemplary insect trap comprises a base having a lower end and an upper end. An internal cavity is defined within its upper end, for receiving a removable cup, which may be used to house bait. The trap further includes a main housing having a lower end and an upper end, and defining a plurality of openings for admitting passage of insects into an internal portion of the main housing. A mounting structure is defined by the main housing adjacent its upper end. The trap further includes a hanger dimensioned to be complementary in size and shape to the upper end of the main housing, and to be mountable onto the mounting structure at the upper end of the main housing for supporting an uncoiled roll of flypaper suspended therefrom. The trap further may include a flypaper centering spacer dimensioned in size and shape to be fitted onto the cardboard tube of an uncoiled roll of flypaper, which serves to center the uncoiled flypaper in the interior of the main housing. An upper cap is dimensioned to be complementary in size and shape to the upper end of the main housing. The upper cap is free from openings allowing passage of any incident water through the upper cap, making the trap more suitable for free-standing outdoor use, outside of any enclosure or overhanging structure, while also resisting penetration of rain/precipitation into the main housing. The base, main housing, hanger and upper cap are thereby matable to define a weather-resistant enclosure for suspending flypaper from the hanger within the main housing above the internal cavity of the base.

DETAILED DESCRIPTION

The present invention provides an improved insect trap that is simple, inexpensive and effective in attracting, trapping, and killing flies that avoids the use and need for commercially-produced chemical-based attractants that deplete over time and require purchase of purpose-specific replenishable materials, and that allows for re-use of the most expensive components of the device, and that does not require hooks or other mounting structures for suspending the device, which limits where the device can be placed. An exemplary insect trap in accordance with the present invention is advantageous in the simplicity of its design. It has no moving parts. It is a freestanding vertically-extending enclosure defining openings in its sides. Inside the enclosure, hanging from the top and down the center, is a single, common, commercially available, strip of flypaper. At the bottom of the tube is a disposable bait cup, which is provided to contain ordinary household food waste as bait, such as pieces of raw fish, beef, pork, lamb, or poultry, which, when left at room temperature give off odors that attract flies. Once the flies enter the tube, they get stuck to the flypaper, die, and in the process of dying, give off an abundant amount of pheromone, which adds to attracting more flies. This allows for pheromone-based attraction without the need to purchase disposable or replenishable purpose specific bait/attractants. The cycle of attracting and killing flies therefore continues. A kill rate of 400 flies per week is obtainable with such a device.

Figure 1:
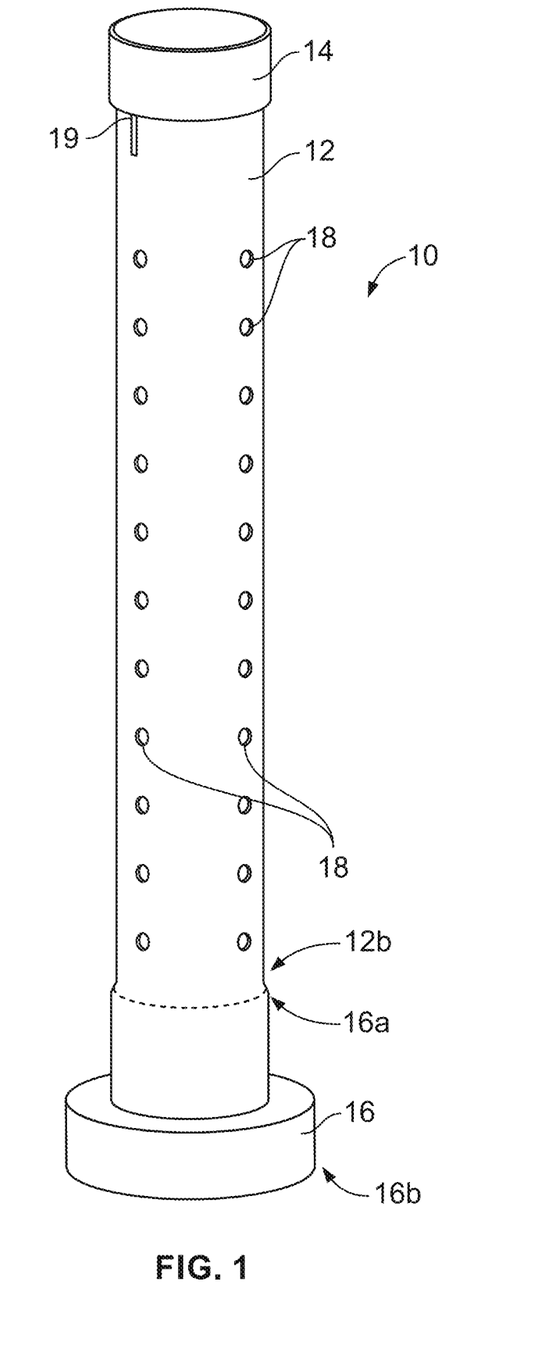
FIG. 1 is a perspective view of an insect trap device in accordance with an exemplary embodiment of the present invention.

An exemplary insect trap in accordance with the present invention is shown in FIGS. 1-12. As shown in FIG. 1, the insect trap 10 includes a main housing 12, a removably attachable base 16, and an upper cap 14, as will be appreciated from FIG. 1. Collectively, the base 16, main housing 12 and upper cap 14 provide an enclosure for receiving and holding an uncoiled roll of flypaper in a substantially weather-proof internal compartment defined thereby. The enclosure may be comprised of sections of approximately 4" diameter round tubing tall enough to allow a single roll of common, commercially available flypaper to hang fully uncoiled inside the enclosure. The enclosure is wide enough to allow for the movement of flies around the flypaper inside.

Figure 2:
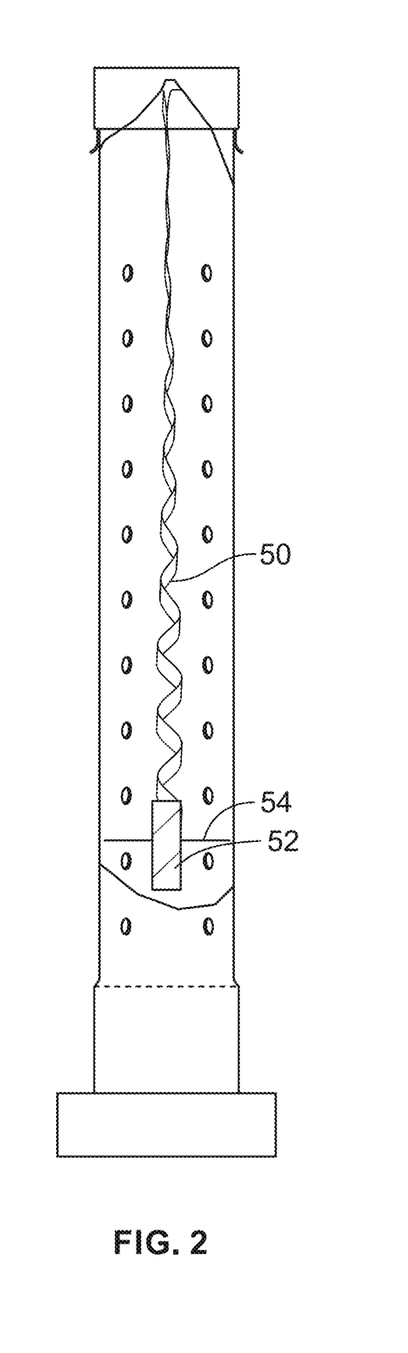
FIG. 2 is a side view of the device of FIG. 1, showing a portion of the enclosure removed for illustrative purposes.
Figure 3:
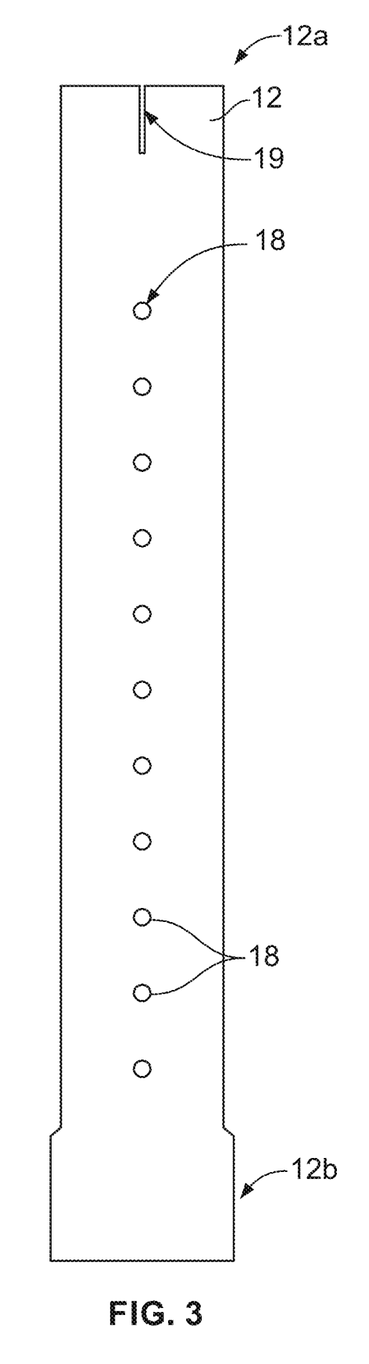
FIG. 3 is a side view of a main housing of the enclosure of the device of FIGS. 1 and 2.

As shown in FIGS. 1 and 2 the main housing 12 may be substantially tubular in shape and it defines a plurality of openings 18 of sufficient size (e.g., 7/16 in diameter) for admitting passage of insects into an internal portion of the main housing 12, where they ultimately get stuck on the flypaper and die. The main housing is elongated along a central axis sufficiently to accommodate an uncoiled roll of conventional flypaper, e.g., at least 30" in length.

The main housing 12 further defines a mounting structure for supporting a flypaper suspension structure, as discussed below. In the exemplary embodiment of FIGS. 1-12, the mounting structure is provided as a pair of opposed open slots 19 open to the end of the housing 12, as can be seen in FIG. 1 and best appreciated from FIG. 3. Any suitable mounting structure may be used for this purpose.

Figure 12:
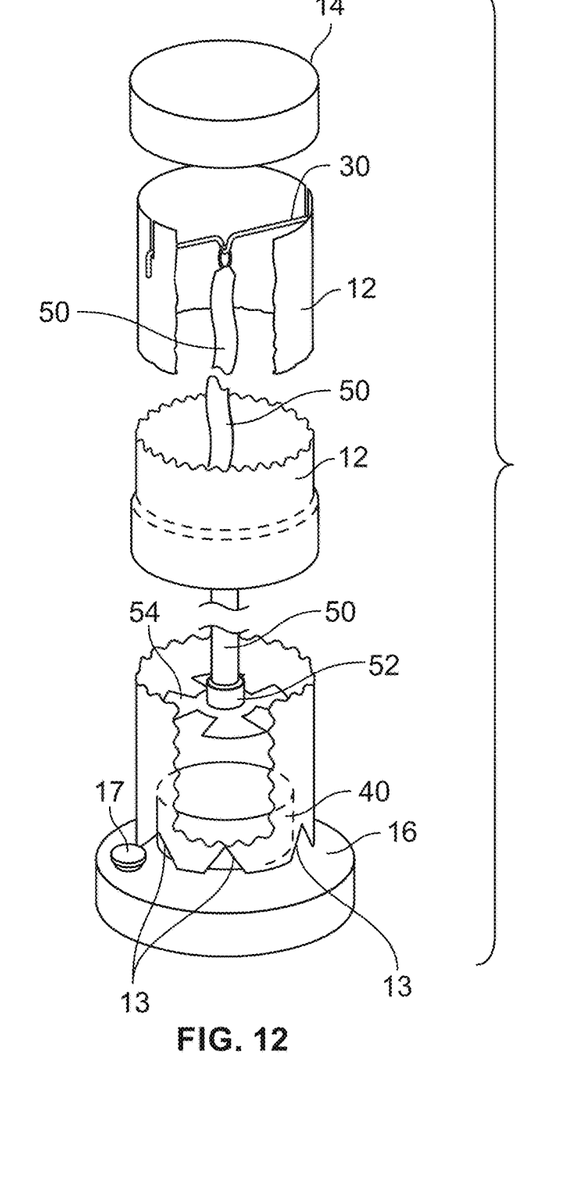
FIG. 12 is an exploded perspective view of part of the device of FIG. 11.

As will be appreciated by FIGS. 1, 2, 3 and 6, the base 16 is matable with the main housing 12, e.g., with a friction fit. They are easily and releasably matable and re-matable manually to allow for easy disassembly and access to the internal portion of the enclosure. The base 16 is preferably weighted such that its weight exceeds the combined weight of the main housing 12 and cap 14. Further, the base 16 has an upper portion 16a dimensioned and shaped to be complementary to a lower end 12b of the main housing, and further has a lower portion 16b having a cross-section, taken transversely to an axis of elongation of the main housing when the base and housing are mated, greater than that of the cross-section of the upper portion. In this manner, the base 16 provides a low center of gravity for the device 10 (lower than the midpoint of the height of the device, and preferably lower than ⅓ of the height of the device), and provides a stable base for supporting the device in an upright position while the device is freestanding on a flat/level surface. Accordingly, there is no need for a hook/support or other overhanging structure from which to suspend the device, which allows to device to be placed in a broader range of locations, e.g., including in the middle of a lawn where a roof/ceiling/other support structure for suspending the device is not present. Further, the base 16 defines an internal cavity 16c for receiving an insertable and replaceable/interchangeable bait cup 40, as described further herein and as best shown in FIG. 12. The bait cup 40 may be a simple disposable paper cup, e.g., all or a portion of a general-purpose paper drinking cup, or a smaller cup. The bait cup 40 is used to receive fly attracting bait, such as common household food scraps, and serves to catch any dead flies or other falling debris that releases from the flypaper. After the bait has dried out and has lost its ability to attract flies, the bait cup 40 may be removed and disposed of, and it may be replaced with a new bait cup 40 containing fresh bait (see bait cup 40, FIG. 12), the base 16, or at least a portion 16b of the base 16, is manufactured to be solid, and/or to house a relatively heavy solid, such as metal or concrete, to provide a weighted aspect to the base 16. See FIGS. 8 and 10. In the alternative embodiment of FIGS. 11-12, the main housing is relatively shorter and the main housing portion of the base is longer, and the main tubing does not cover and hide the drain holes. Additionally, the base 16, or at least a portion of the base 16, is hollow and is manufactured/sold/shipped empty, so that weight can be added after manufacture, e.g., by an end user. In the exemplary embodiment of FIGS. 11-12, the base 16 is hollow and is provided with an opening and screw-type cap 17 that can be removed to allow the base to be filled with water, sand or other ballast by an end user, to provide a weighted aspect to the base 16 for use while keeping the device relatively light for shipping/transportation purposes. It should be noted that this base shown in FIG. 12 may be combined with the embodiment shown in FIGS. 1-12.

In the exemplary embodiment of FIGS. 1-12, the base 16 defines a plurality of drain holes 13 in the upwardly extending tube portion 16a. The drain holes 13 serve multiple purposes. First, if the insect trap 10 is left outdoors in a heavy rain, any rain water that enters through the insect inlet holes can drain out via the drain holes 13. Second, the drain holes 13 allow for easy cleanout of the base 16, e.g., by rinsing with a garden hose.

Figure 4:
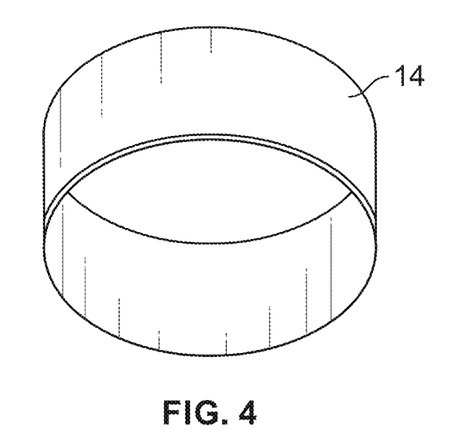
FIG. 4 is a perspective view of an upper cap of the device of FIGS. 1 and 2.

In the exemplary embodiment of FIGS. 1-12, a lower end 12b of the main housing has an increased cross-section for mating with the base 16 that has a cross section and outer dimensions corresponding to an adjacent portion of the main housing 12 for a friction fit. As shown in FIGS. 1, 2 and 4. the upper cap 14 is generally hollow, with side portions dimensioned to be matable with the main housing 12, e.g., with a friction fit. It is easily and releasably matable and re-matable manually to allow for easy disassembly and access to and internal portion of the enclosure. Notably, the cap has a continuous top surface that is free from openings that would be required for hanging of the device with a hook, etc. under a ceiling or other support structure, and that would allow rainwater to enter the device when the device is used in free-standing fashion in areas that are not protected by a roof/overhang or other supporting structure. In this manner, the cap contributes to the providing of an enclosure for receiving and holding an uncoiled roll of flypaper 50 in a substantially weather-proof internal compartment defined thereby.

Figure 5A:
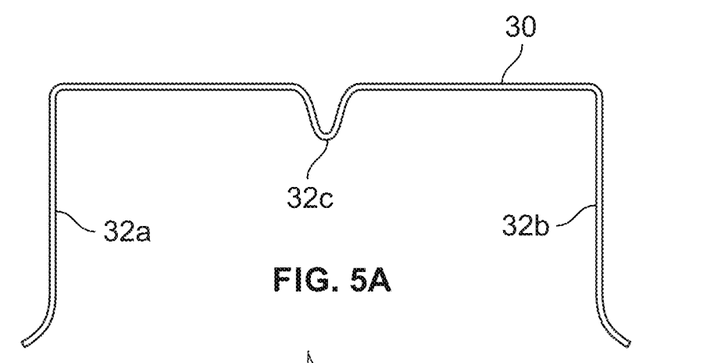
FIG. 5A is a side view of a hanger of the device of FIGS. 1 and 2.
Figures 8, 9, 10:
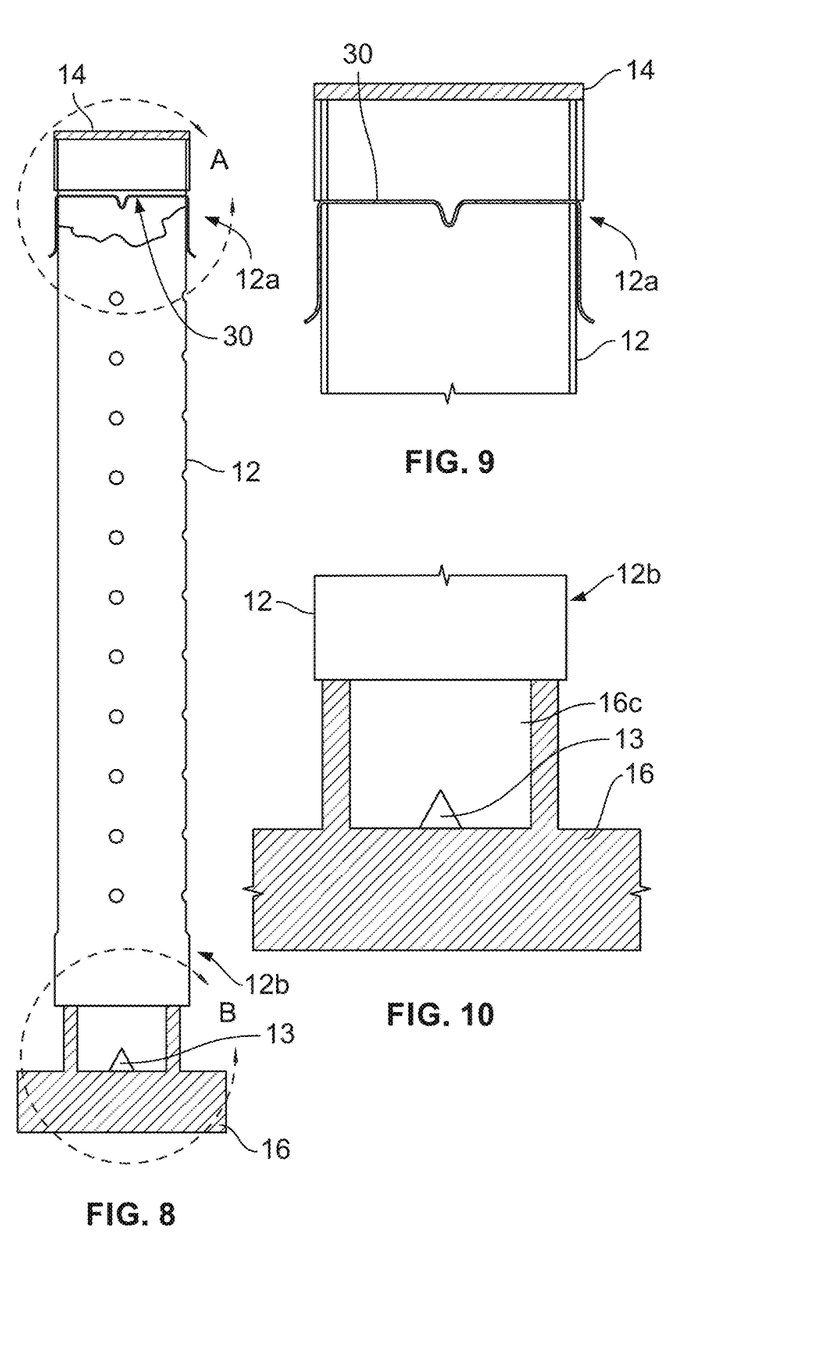
FIG. 8 is a cross-sectional view of the device of FIGS. 1 and 2, taken along line XX' of FIG. 7.
FIG. 9 is a partial enlarged view of portion A of FIG. 8.
FIG. 10 is a partial enlarged view of portion B of FIG. 8.
Figure 11:
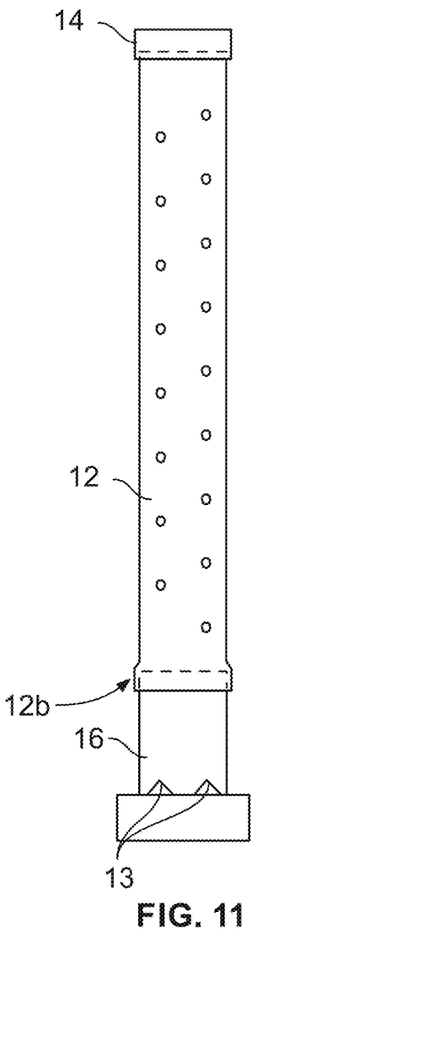
FIG. 11 is a side view of an insect trap device in accordance with an alternative exemplary embodiment of the present invention.

The device further includes a hanger 30 that is mounted via the mounting structure to an upper end 12*a* of the main housing 12, as shown in FIGS. 8 and 9. In the exemplary embodiment of FIGS. 1-12 the hanger 30 is formed of continuous wire that has ends 32*a*, 32*b* bent 90 degrees downwardly (and optionally, with flared ends) such that the hanger can be placed in and stably retained in the slots 19 of the main housing 12, as will be appreciated from FIGS. 3, 8 and 9. This exemplary hanger 30 also has a generally U-shaped bend 32*c* in its central portion for mounting the flypaper thereto (as shown in FIG. 5*a*). For example, commercially-available flypaper has a small cloth or plastic loop at its upper end that the hanger can be passed through, thus allowing it to hang from the U-shaped bend (as shown in FIGS. 2 and 12. FIGS. 2 and 12 show the device supporting a roll of uncoiled flypaper 50 hanging within the enclosure from the hanger 30.

The device may be used as follows. The base 16 may be filled with water, sand or other ballast if needed, as in the alternative embodiment, and the cap 17 may be secured to the base 16 to retain the ballast. The base 16 may then be placed on a generally flat/level surface wherever the device is desired to be used. Food scraps for use as fly-attracting bait may then be placed in a bait cup 40, and the cup 40 may be placed in the internal cavity 16*c* of the base 16.

Next, the lower end 12*b* of the main housing is coupled to the base 16, e.g., by a press-fit, such that the two are securely attached to one another. Next, a roll of common commercially-available flypaper 50 may be uncoiled and hung from the "U" bend of the hanger 30, which serves to center the coil of flypaper within the enclosure during and after assembly. A main housing 12 may have a length of approximately 36 inches for accommodating many common flypaper rolls.

Figure 5B:
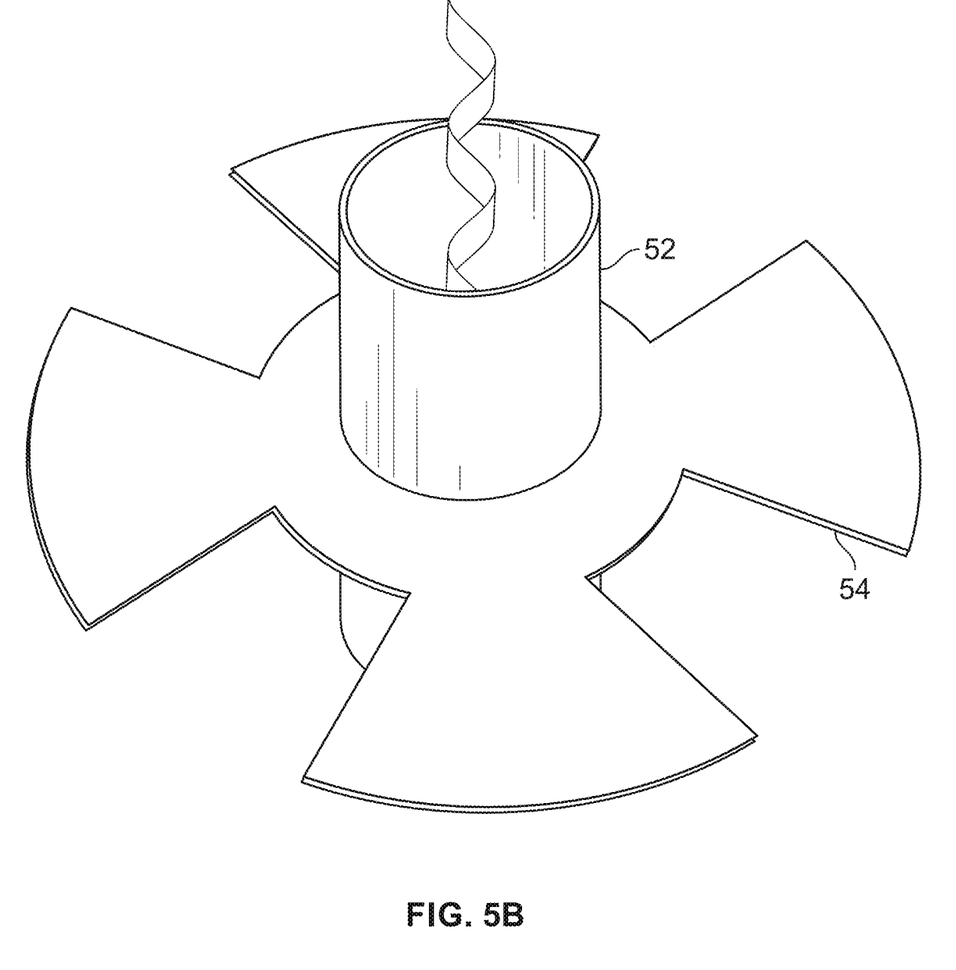
FIG. 5B is a perspective view of a flypaper centering spacer fitted to a conventional tube of flypaper.
Figure 6:
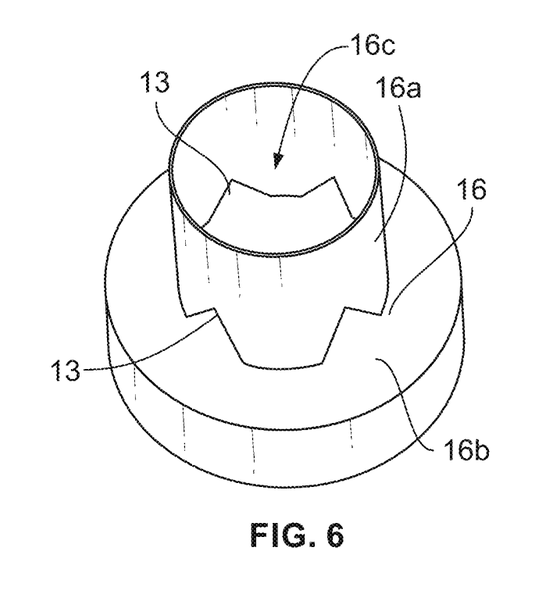
FIG. 6 is a perspective view of a base of the device of FIGS. 1 and 2.
Figure 7:
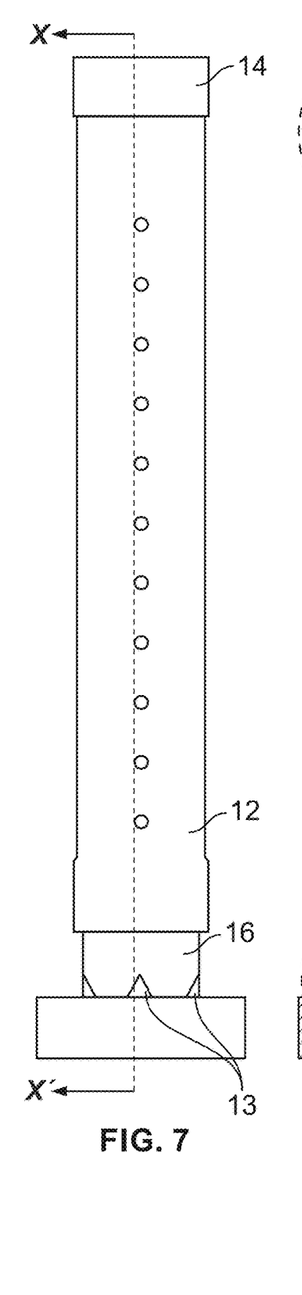
FIG. 7 is a side view of the device of FIGS. 1 and 2.

Additionally, a flypaper centering spacer 54 may be placed onto and around the flypaper tube 52 before the new flypaper is uncoiled, as shown in FIG. 5B. The flypaper centering spacer 54 is preferably provided as a body having a maximum dimension (e.g., maximum width) that is slightly less than the minimum interior dimension (e.g., diameter) of the main housing 12. For example, the flypaper centering spacer 54 may have three or more fins extending radially from a common center, the main housing may have a 4-inch internal diameter, and the flypaper centering pacer may have a width of about 3.25 inches up to a maximum of 3.75 inches. The flypaper centering spacer 54 may define a central opening dimensioned to receive a housing tube 52 of a roll of flypaper. For example, a central opening measuring approximate ¹³⁄₁₆ inches may be sufficient for this purpose. The flypaper centering spacer may have slits spaced around the central opening to enhance flexibility of the spacer to accommodate a flypaper housing tube slightly larger than the hole, and to retain it within the hole in an interference fit.

The uncoiled flypaper 50/tube 52 is then lowered into the main housing 12 via its upper end, and the hanger is placed into the slots/mounted to the mounting structures at the upper end 12*a* of the main housing 12, so that the flypaper 50 hangs down within the main housing 12. The flypaper centering spacer 54 assists in lowering of the uncoiled flypaper 50 into the main body tubing without its extremely sticky viscous tackifier material contacting and adhering to an inside surface of the tubing, and also, in conjunction with the flypaper suspension structure 30 centers the uncoiled hanging flypaper 50 in the tubing, which allows for the movement of flies around the flypaper inside the insect trap. The upper cap 14 is then placed onto the upper end 12*a* of the main housing 12 to capture the hanger 30 and flypaper 50, and to complete the enclosure.

Periodically, it is desirable to change the bait, and/or change the flypaper. Changing the flypaper 50 is accomplished by removing the upper cap 14 from the base, lifting out the hanger 30, which has the old flypaper 50 attached to it, removing the flypaper centering spacer 54 from the old flypaper tube 52, removing the old flypaper 50 from the hanger 30, and discarding it. The flypaper centering spacer 54 may then be fitted to a new tube of flypaper 52, or may be replaced, and the new tube 52 of flypaper 50 may then be uncoiled, attached to the hanger 30, the hanger 30 may be replaced into/onto the mounting structures of the main housing 12, and the cap 14 may be replaced on the upper end of the main housing 12.

Changing the bait is accomplished by removing the main housing from the base 16. This exposes the used bait cup 40 in the cavity 16*c* of the base 16, which may be lifted out, disposed of, and replaced with a new paper cup containing fresh fly attracting bait. Cleaning is easily accomplished with soapy water and a garden hose as needed.

The base 16, main housing 12 and cap 14 may be made of PVC or other rigid plastic. Alternatively, rigid cardboard may be used for one or more of these components. The main housing, cap and base may be generally round in cross-section as shown, or may be square, rectangular, triangular, hexagonal, octagonal, or any number of other polygons in cross-section while maintaining a space wide enough to allow for the movement of flies around the flypaper inside the enclosure. In alternative embodiments, the main housing 12 is hinged along its full length so that the two halves can be opened for easy access to the wire hanger 30 and the flypaper 50. In such an embodiment, opposite the hinge, clasps, toggles, or some other means of securing the two halves of the elongated member are positioned in such a manner that allows for maintaining the sections securely closed. Alternatively, the housing 12 may have separate halves with the opposing seams along its full length. This allows the two halves to be nested, one into the other, to facilitate packing for shipping. For assembly purposes, the two halves have interlocking seams with clasps, toggles, or other means, positioned in such a manner that allow for maintaining the halves securely mated/closed. The plurality of insect inlet holes may be arranged in a continuous spiral, from top to bottom, around the periphery of the main housing, or in any other desired patterns.

The bait cup 40 may be paper or plastic (disposable) or a reusable material that would require regular cleaning. A reusable bait cup could reduce costs by negating the ongoing expense of replacing disposable bait cups. The hanger 30 may be shaped differently than that shown herein, and it may be made of any of a number of materials, some rust and corrosion proof for outdoor use, and some not rust and corrosion proof for indoor use. The mounting structure for holding the wire hanger 30 in position may be defined as holes instead of slots. Alternatively, the hanger may be retained by nuts secured onto threaded ends of the wire hanger, in which case the bent ends of the hanger may be omitted.

The flypaper centering spacer 54 may be cardboard (preferred for disposability) or a reusable material, such as plastic, which would require regular cleaning. A reusable flypaper centering device could reduce costs by negating the ongoing expense of replacing disposable flypaper centering devices.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An insect trap comprising:
   a base having a lower end and an upper end, said base defining an internal cavity at its upper end;
   a main housing having a lower end and an upper end, said main housing defining a plurality of openings for admitting passage of insects into an internal portion of said main housing, said main housing defining a mounting structure adjacent its upper end;
   a hanger dimensioned to be complementary in size and shape to said upper end of said main housing, and to be mountable onto said mounting structure at said upper end of said main housing for supporting an uncoiled roll of flypaper suspended therefrom;
   an upper cap dimensioned to be complementary in size and shape to said upper end of said main housing, said upper cap being free from openings allowing passage of any incident water through said upper cap; and
   a removable cup dimensioned to be insertable in said internal cavity of said base;
   whereby said base, main housing, hanger and upper cap are matable to define a weather-resistant enclosure for suspending flypaper from said hanger within said main housing above said internal cavity of said base.

2. The insect trap of claim 1, wherein said main housing is tubular in shape.

3. The insect trap of claim 2, wherein said main housing is cylindrical in cross-section.

4. The insect trap of claim 1, wherein said mounting structure is defined as a pair of opposed slots, each of said pair of opposed slots being open to said upper end of said main housing.

5. The insect trap of claim 1, wherein said upper end of said base and said lower end of said main housing are dimensioned to be complementary in size and shape for forming a friction fit therebetween.

6. The insect trap of claim 5, wherein said lower end of said main housing has an increased cross-section for mating with said upper end of said base.

7. The insect trap of claim 1, wherein said base is weighted such that its weight exceeds a combined weight of said main housing and said upper cap.

8. The insect trap of claim 7, wherein said base is constructed of a solid material free of internal voids.

9. The insect trap of claim 7, wherein said base is constructed to provide a chamber for receiving material for adding weight to said base.

10. The insect trap of claim 9, wherein said chamber of said base is accessible via an opening closable by a cap mountable to a fitting on said base.

11. The insect trap of claim 1, wherein said lower end of said base has a cross-section, taken transversely to an axis of elongation of said main housing when said base and housing are mated, that is greater than that of a respective cross-section of said upper end of said base.

12. The insect trap of claim 1, wherein said base defines at least one drainage opening extending through said lower end of said base to said internal cavity.

13. The insect trap of claim 1, wherein said upper cap is dimensioned to be complementary in size and shape to said upper end of said main housing for forming a friction fit therewith.

14. The insect trap of claim 1, wherein said upper cap has a continuous top surface free from openings.

15. The insect trap of claim 1, wherein said hanger is formed of as a continuous structure extending along an axis of elongation, and has opposed end portions extending transversely to said direction in a common plane.

16. The insect trap of claim 1, wherein said hanger is formed to have a U-shaped central portion for mounting the flypaper thereto.

17. The insect trap of claim 1, further comprising a centering spacer defining a central opening dimensioned for receiving a roll of flypaper, said centering spacer having a maximum cross-section that is less than a minimum internal cross-section dimension of said main housing.

18. The insect trap of claim 1, wherein said main housing comprises a plurality of sections joined by a hinge.

19. The insect trap of claim 1, wherein said main housing comprises a plurality of sections joinable to one another to form said main housing.

20. An insect trap comprising:
    a base having a lower end and an upper end defining an internal cavity;
    a main housing having a lower end and an upper end, said main housing defining a plurality of openings for admitting passage of insects into an internal portion of said main housing, said main housing defining a mounting structure adjacent its upper end;
    an upper cap dimensioned to be complementary in size and shape to said upper end of said main housing, said upper cap being free from openings allowing passage of any incident water through said upper cap;
    a hanger for supporting an uncoiled roll of flypaper within said main housing; and
    a removable cup dimensioned to be insertable in said internal cavity of said base;
    whereby said base, main housing, hanger and upper cap are matable to define a weather-resistant enclosure for suspending flypaper from said hanger within said main housing above said internal cavity of said base.

21. An insect trap comprising:
    a base having a lower end and an upper end, said base defining an internal cavity within its upper end, said base defining at least one drainage opening extending through said base to said internal cavity;
    a main housing having a lower end and an upper end, said main housing defining a plurality of openings for admitting passage of insects into an internal portion of said main housing, said upper end of said base and said lower end of said main housing being dimensioned to be complementary in size and shape for forming a friction fit therebetween, said main housing defining a mounting structure adjacent its upper end, said mounting structure being defined as a pair of opposed slots, each of said pair of opposed slots being open to said upper end of said main housing;
    a hanger dimensioned to be complementary in size and shape to said upper end of said main housing, and to be mountable onto said mounting structure at said upper end of said main housing for supporting an uncoiled roll of flypaper suspended therefrom, said hanger being formed to have a pair of end portions extending transversely to a direction of elongation of said hanger and to have a U-shaped central portion for mounting flypaper thereto; a centering spacer defining a central opening dimensioned for receiving a roll of flypaper, said centering spacer having a maximum cross-section that is less than a minimum internal dimension of said main housing;

an upper cap dimensioned to be complementary in size and shape to said upper end of said main housing, said upper cap being free from openings allowing passage of any incident water through said upper cap; and a removable cup dimensioned for receipt in said internal cavity of said base;

whereby said base, main housing, hanger and upper cap are matable to define a weather-resistant enclosure for suspending flypaper from said hanger within said main housing above said internal cavity of said base.

\* \* \* \* \*